March 24, 1970  TAKESHI ATAKE  3,502,014
CAMERA CAPABLE OF CARRYING AN INTERCHANGEABLE LENS ASSEMBLY
Filed July 3, 1967  3 Sheets-Sheet 1

United States Patent Office 3,502,014
Patented Mar. 24, 1970

3,502,014
CAMERA CAPABLE OF CARRYING AN INTERCHANGEABLE LENS ASSEMBLY
Takeshi Atake, Osaka, and Minoru Sekida and Shohei Tenkumo, Sakai, Japan, assignors to Minolta Camera Kabushiki Kaisha, Osaka, Japan, a corporation of Japan
Filed July 3, 1967, Ser. No. 650,724
Claims priority, application Japan, July 8, 1966, 41/64,556; May 12, 1967, 42/30,089
Int. Cl. G03b 9/00, 9/02, 3/00
U.S. Cl. 95—53
2 Claims

ABSTRACT OF THE DISCLOSURE

A camera having a body capable of receiving one of a plurality of interchangeable lens assemblies. Each lens assembly has self contained shutter blades and that portion of an electrical actuating circuit for actuating the blades and controlling the shutter speed. The remainder of the circuit is located in the camera body and is coupled to that portion of the particular lens assembly by an electrical connector between the body and the lens assembly. The body contains a focal plane shutter and a selector for controlling the operation of the focal plane shutter and the lens shutter.

---

This invention relates to a camera having an interchangeable lens assembly, and more particularly to such a camera the interchangeable lens assembly of which has an electric shutter circuit comprising a first portion mounted on the shutter portion of a lens cylinder of the camera and a second portion mounted on the body of the camera, said first portion being provided with such circuit elements as an electromagnet and a trigger switch and adapted to operate directly on shutter blades, said second portion consisting of other major components of the electric shutter circuit.

More particularly, the present invention relates to a novel camera capable of using selectively either a focal plane shutter or a lens shutter, mounting a selected interchangeable lens assembly at a high speed, setting readily both the degree of high speed exposure and the synchronism of an electronic flash with the high speed exposure. A preferable form of the camera according to the present invention comprises a body having a focal plane shutter operating mechanism and an exposure time control circuit having at least an electromagnet and a control mechanism for regulating the operation of a shutter operating mechanism responsive to the setting of said control circuit, a special interchangeable lens assembly including a conventional lens aperture control mechanism for a focal plane shutter and lens shutter sectors equipped with an actuating means therefore, and a selecting mechanism for changing over electric circuits and mechanical elements related to the focal plane shutter and the lens shutter so as to select either said focal plane or said lens shutter so as to best suit any particular photographic conditions.

Heretofore, most cameras capable of carrying an interchangeable lens assembly have had focal plane shutters provided thereon. With such conventional cameras, the maximum shutter speed in synchronism with an electronic flash or Strobo (trade name) is limited to about 1/30 to 1/60 of second at most, and it has been extremely difficult to synchronize the shutter operation with an electronic flash at a higher speed when conventional shutter mechanisms are used. In the case of lens shutters, the high speed synchronization is possible, but each interchangeable lens assembly has to be provided with a lens shutter, and the camera becomes expensive.

Only a few exceptional cameras of special type have shutters of both focal plane and lens types. However, in such special type cameras, only the lens shutters are used in the main, and the focal plane shutter is provided for auxiliary purposes and its performance and operative characteristics have not been satisfactory.

According to a feature of the present invention, the number of component parts to be mounted on a lens shutter portion is small to make the interchangeable lens assembly less expensive, and the major elements of an electric shutter circuit is built in the body of the camera so that dispersion of shutter speeds caused by exchanging of the interchangeable lens assemblies is minimized.

A camera according to the present invention can be also used as a conventional focal plane shutter camera when an interchangeable lens assembly of conventional construction for a focal plane shutter is mounted thereon, because the body of the camera of the present invention includes as built-in components, an exposure time control circuit applicable to both a focal plane shutter and a lens shutter, a focal plane shutter operating mechanism, and a control mechanism for regulating the operation of the shutter operating mechanism responsive to the value of control quantity given by said exposure time control circuit. When the aforesaid special interchangeable lens assembly including a simple sector type lens aperture control mechanism is mounted on the camera body of the present invention, either the focal plane shutter or the lens shutter can be selectively used with ease so as to best suit the photographing conditions by utilizing said control mechanism for regulation of either thereof. Thus, the advantages of both the focal plane shutter and the lens shutter can be utilized to improve the performance characteristics of the camera, and in addition, by using the common control mechanism of a shutter operating mechanism in conjunction with the exposure time control circuit, the shutter control circuit having an electromagnet and other circuit elements can be used for both type shutters in common. When the principles of the present invention are used in a lens shutter of a monocular reflex camera, the mask for the focal plane shutter can be used as a light shielding plate.

Furthermore, in the camera structure according to the present invention, a shutter operating mechanism and a control mechanism are provided separately for both type shutters, and hence, a switch over mechanism can be easily built therein in order to switch over a part of the camera mechanism after a particular type shutter is selected. Thus, in the course of assembling the camera, each type shutter can be adjusted independently and easily.

Other features and a fuller understanding of the present invention will become clear by referring to the following description taken in conjunction with the accompanying drawings, in which.

The same symbols and the same reference numerals represent the same component parts throughout the accompanying drawings.

Figure 1:
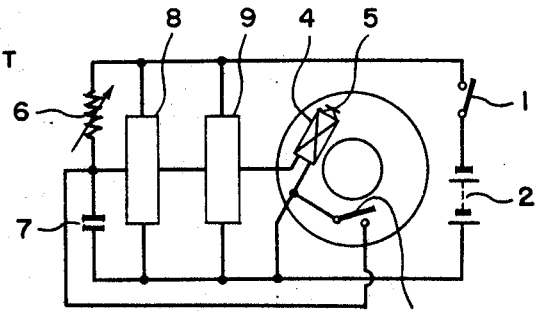
FIG. 1 is a schematic diagram of an electric shutter circuit.

FIG. 1 shows a diagram of an electric shutter circuit using a known counter circuit, which comprises a power circuit switch 1, an electric source such as cells or batteries 2, a trigger switch 3, an electromagnet 4, a contact piece 5 to be held as attracted by said electromagnet as long as the latter is energized, a variable resistor 6 for setting the shutter time, and a capacitor 7. The shutter circuit further comprises a switching circuit 8 and an amplifying circuit 9. When a shutter (not shown) is released, the power circuit switch 1 is closed to energize the electromagnet 4, and contact piece 5 is attracted to the electromagnet. As the shutter blades (not shown) start to open, the trigger switch 3 is opened to interrupt the short circuit condition of the capacitor 7, and the charging of the capacitor 7 begins through the resistor 6 previously set so as to correspond to a desirable shutter speed. Then, the shutter blades are fully opened, and this state is held while the contact piece 5 is attracted by the electromagnet 4. When the voltage across the capacitor 7 increases to a predetermined level, both the switching circuit 8 and an amplifying circuit 9 are actuated to energize a relay in order to interrupt the current through the electromagnet 4. Accordingly, the contact piece 5 is separated from the electromagnet 4, and the shutter blades are closed. In the example of FIG. 1, the shutter speed is changed by varying the setting of the variable resistor 6. Such setting of the shutter speed can be made by a rheostat, as depicted by 16 in FIG. 2, or by switching over fixed resistors, as depicted by 15 in FIG. 3. In the case of the shutter circuits of FIGS. 2 and 3, the resistor for setting the shutter time can be placed at a position occupied by a resistor 10.

Figure 2:
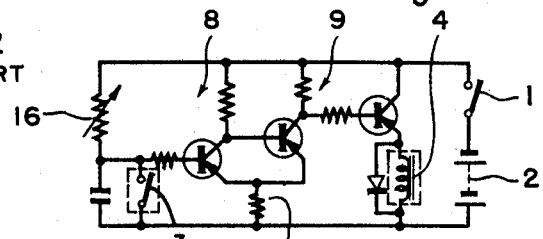
FIGS. 2 and 3 are views similar to FIG. 1, illustrating known shutter circuits.
Figure 3:
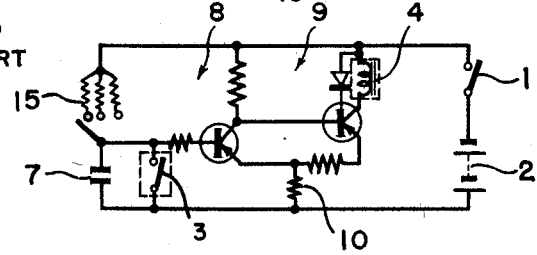
Figure 4:
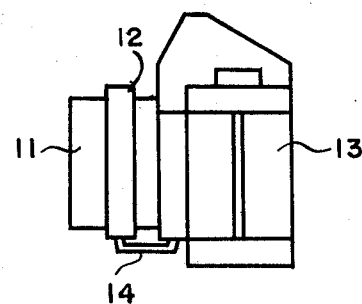
FIG. 4 is a diagrammatic illustration of circuit arrangement between a lens cylinder and a camera body.

In a camera according to the present invention, the known electric circuitry for the shutter as shown in FIGS. 1 to 3 is used, but some circuit elements are placed in a special interchangeable lens assembly while mounting the major circuit elements on a camera body. In other words, the trigger switch 3 and electromagnet 4 (shown in FIGS. 2 and 3) are placed within a shutter portion 12 of a lens cylinder 11, as shown in FIG. 4. The remainder of the electric shutter circuit including the power circuit switch 1, the batteries or a power source 2, the shutter switching resistor 6, the capacitor 7, the time detecting circuit 8, and the amplifying circuit 9, is mounted in a camera body 13. To complete the shutter circuit, a lead wire 14 is provided between the lens cylinder 11 and the camera body 13. The lead wire 14 includes three insulated conductors, in the case of the circuit of FIG. 2, or it includes four insulated conductors in the case of the circuit in FIG. 3. Such lead wire 14 can be substituted by a suitable connector which is adapted to make proper electric connection between the lens cylinder 11 and the camera body 13 when the former is securely mounted on the latter.

It is apparent to those skilled in the art that when lens aperture control blades, shutter blades, and springs for actuating the shutter blades are necessary, such blades and springs are mounted within the lens cylinder, as in the case of conventional cameras. Diodes used in FIGS. 2 and 3 can be mounted on either the lens cylinder 11 or the camera body 13. Two electromagnets, one for opening blades and one for closing blades, can also be mounted within the lens cylinder 11.

Figure 5:
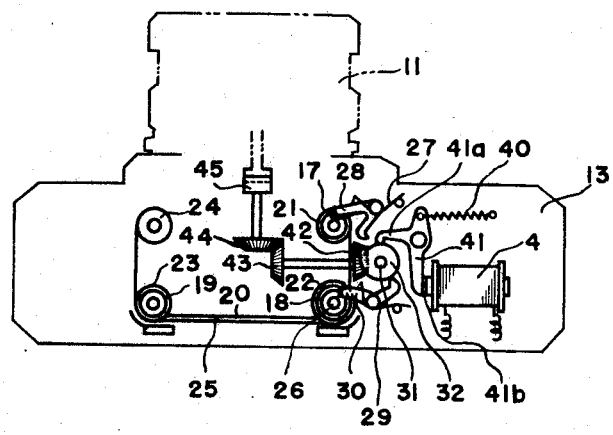
FIG. 5 is a schematic illustration of a focal plane shutter operating mechanism and a control mechanism provided within a camera body.

FIGS. 5 to 8 show an embodiment of the camera according to the present invention. Referring to FIG. 5 illustrating a camera having a focal plane shutter, a special interchangeable lens assembly cylinder 11 having shutter sectors (not shown) and a sector operating mechanism secured thereto is mounted on a camera body 13. The focal plane shutter is shown as wound up in FIG. 5. In the camera body 13, there is provided a known front mask system comprising a front mask cylinder 17, a front mask idle roller 18, a front mask take up cylinder 19, a front mask 20, and a front mask stop plate 21 mounted on the front mask cylinder 17. There is also provided a known rear mask system in the camera body, which comprises a rear mask cylinder 22, rear mask idle roller 23, a rear mask take up cylinder 24, a rear mask 25, and a rear mask stop plate 26 mounted on said rear mask cylinder 22. When the front and rear mask systems for actuating the focal plane shutter wound up by a winding means (not shown), it is kept wound without any direct connection to the winding means. To do so, there are provide a front mask stop lever 28 biased in a counterclockwise direction by a spring 27 and engaged with said front mask stop plate 21, and a rear mask stop lever 30 biased in a counterclockwise direction by another spring 29.

Figure 6:
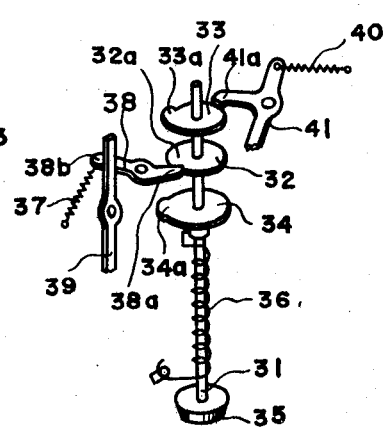
FIG. 6 is an enlarged perspective view of a portion of the control mechanism.

Referring to FIG. 6, a shutter control mechanism for regulating the operation of a shutter operating mechanism comprises a main shaft 31, first and second stop plates 32 and 33 secured to the upper portion of the main shaft 31, a focal plane kick off cam 34 secured to the intermediate portion of the same shaft, a transmission bevel gear 35 mounted at the lower end of the main shaft, and a bias spring 36 biasing the main shaft 31 in a counter-clockwise direction, a first stop lever 38 is pivotally supported by the camera body at the central portion thereof and biased in a counterclockwise direction by a spring in such a manner that a claw 38a formed at one end of the lever 38 operatively engages with a notch 32a of the first stop plate 32. The opposite end 38b of the first stop lever is engaged with one end of a start lever 39 for releasing stoppage of the main shaft 31, and at the same time it is interconnected with an exposing mechanism (not shown) to be actuated by depression of a shutter button, such as a mirror driving mechanism. A second stop lever 41 is also pivotally supported by the camera body at the central portion thereof and biased by a spring 40 in a clockwise direction in such a manner that a claw 41a formed on the stop lever 41 is spaced from a notch 33a of said second stop plate 33 by a predetermined distance. The second stop lever 41 has an arm which is adapted to be attracted by an electromagnet 4 (not shown, in FIG. 6) of a suitable exposure time control circuit.

In the particular example illustrated in FIG. 6, the main shaft of the operating mechanism is stopped when the focal plane shutter is wound up by the second stop lever 41 by means of attraction of the electromagnet 4 against the elastic force of the spring 40. However, it is also possible to provide a mechanical support member adapted to hold the control mechanism at the illustrated position upon release thereof, which mechanical support member is to be released after an attraction is generated in the electromagnet by using the operative force of a shutter release mechanism to be started by depression of a shutter button.

The control mechanism further comprises a series of transmission gears 35, 42, 43, and 44 for transmitting the rotation of the aforesaid main shaft 31, and a mechanical joint 45 mounted on the camera body, as shown in FIG. 5.

Figure 7:
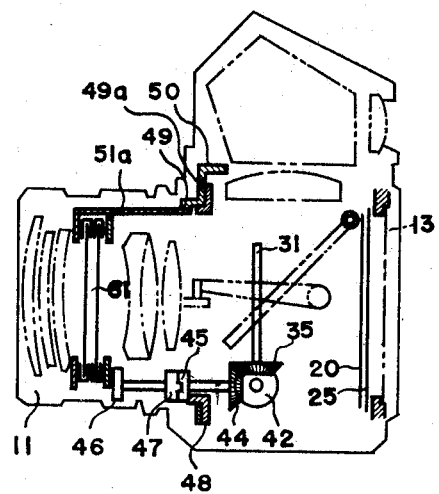
FIG. 7 is a sectional view taken on the line VII—VII of FIG. 8, illustrating construction of a monocular reflex camera comprising a body and a special interchangeable lens assembly according to the present invention.
Figure 8:
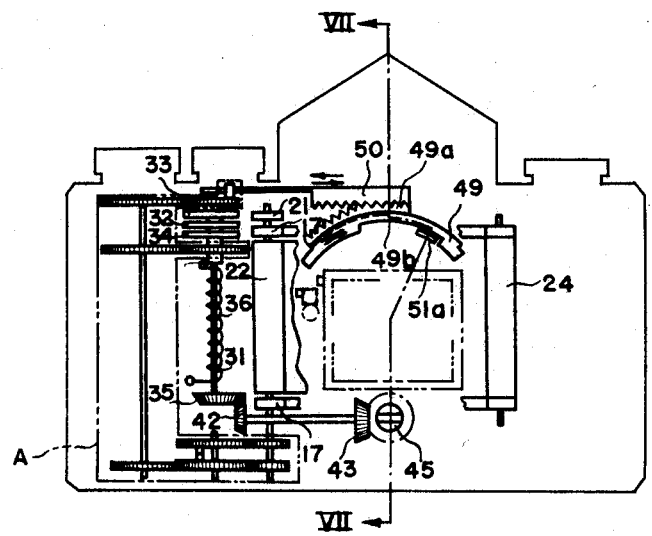
FIG. 8 is a schematic front elevation view, illustrating the manner in which a shutter and a control mechanism are charged.

Referring to FIGS. 7 and 8, therein is shown a mechanical joint 47 mounted in the special interchangeable lens assembly cylinder 11, which is adapted to engage with the joint 45 on the camera body in such a manner a lens shutter kick off cam 46 secured at one end of a shaft extending from the joint 47 can act as interconnecting means between a sector actuating mechanism in the lens cylinder 11 and a combination of the control mechanism and the focal plane shutter operating mechanism in the camera body 13. There is also provided a set ring 51 (FIG. 9) within the lens assembly cylinder 11, and an extended arm 51a, formed as an integral part of the set ring 51, is engaged with a notch 49b of a shutter charge ring 49 mounted rotatably on a fixed ring base 48 in the camera body 13 at a position behind a lens mounted thereof. The set ring 51 is adapted to be rotated by turning the shutter charge ring 49 through the engagement between the extended arm 51a and the notch 49b. FIG. 8 shows the extended arm 51a at a position to be occupied thereby when the focal plane shutter is wound up.

The shutter charge ring 49 is adapted to rotate within a predetermined angular range around the ring base 48, and it is provided with gear teeth 49a on its outer periphery. The gear teeth 49a are meshed with a charging rack 50, which is in turn adapted to reciprocate in conjunction with a winding mechanism encircled by dash-dot lines A in FIG. 8. Thus, it is apparent that rotation of the set ring 50 is related with the actuation of the winding mechanism.

Figures 9, 10:
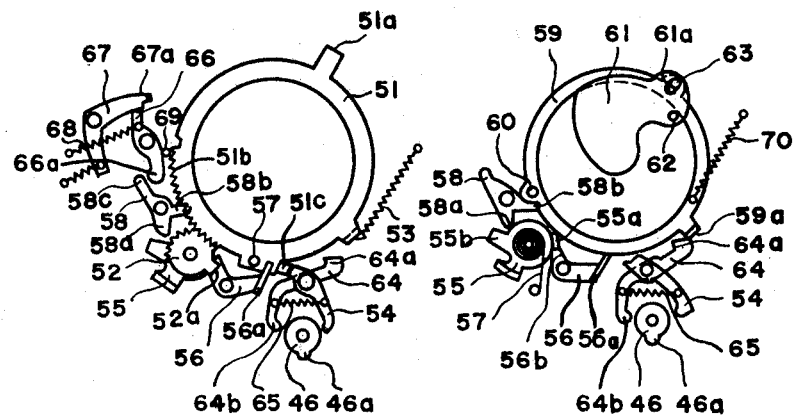
FIGS. 9 and 10 are diagrammatic illustrations of shutter operating mechanisms to be mounted within the lens cylinder of a special interchangeable lens assembly.

FIGS. 9 and 10 illustrate a sector operating mechanism in the special interchangeable lens assembly cylinder 11, as viewed from the front of the camera. FIG. 10 is a view taken by cutting off a portion of FIG. 9. The set ring 51 has a toothed portion 51b in mesh with a segment gear 52 and a stepped portion 51c engaged with a set ring starting lever 54, and is biased by a spring 53 in a counter-clockwise direction. A kick-off pin 57 is secured on the set ring 51, so that the kick-off pin 57 engages with the bent portion 56a of a cam stop lever 56 so as to release a sector opening cam 55 under the condition of shutter release. The segment gear 52 is adapted to rotate coaxially with the sector opening cam 55, and is provided with a bent portion 52a engageable with a corresponding bent portion 55a of the sector opening cam 55. The sector opening cam 55 is turned by the segment gear 52 through the engagement between the bent portions 52a and 55a in a direction to generate clockwise revolving force in a cam spring 57 (FIG. 10), and then the cam 55 is stopped by the aforesaid cam stop lever 56.

To transmit the rotation of the sector opening cam 55 to a sector ring 59, there is an interconnecting lever 58 having an arm 58a engageable with a projection 55b of the sector operating cam 55 and another arm 58b engageable with a pin 60 secured on the sector ring 59. The sector ring 59 has a plurality of drive pins 63 mounted thereon, only one of which is illustrated in FIG. 10 for simplicity, fitted in the slot 61a of each sector 61 so as to rotate the sector ring 61 around a pin 62 secured to the lens cylinder 11 responsive to reciprocation of the sector ring 59. It should be noted here that only one sector 61 and a pin 62 are shown in FIG. 10 for the sake of clarity, but there are actually a plurality of sectors to complete a shutter. The sector ring 59 has a bent portion 59a to be engaged with a sector stop lever 64 when the sector ring 59 is turned clockwise to open the sectors to their full open position. A spring 70 is provided to bias the sector ring 59 in a counter-clockwise direction. The sector stop lever 64 is mounted on the same shaft as the set ring starting lever 54 so as to rotate in a coaxial manner with the latter lever. A spring 65 is provided between the set ring starting lever 54 and the sector ring stop lever 64 to apply elastic forces to the two levers in opposite directions, so as to ensure proper operation of the two levers. The lower ends of the levers 54 and 64 are engageable with a lens shutter kick-off cam 46. The set ring starting lever 54 stops the set ring 51.

To nullify the function of the lens shutter, there are provided a sector opening lever 66 and a sector holding lever 67, which are adapted to operate independently of the sector opening cam 55 so as to rotate the sector ring 59 through an arm 58c of the interconnecting lever 58 and to open and keep open the sectors. The sector opening lever 66 is biased by a spring 68 in a counter-clockwise direction, and its idle position is controlled by a pin 69. For actuation of the sector opening lever 66, it is either interconnected with a shutter type selecting mechanism (not shown) or so constructed as to be actuated independently by itself. When the sectors 61 are opened by this lever 66, the sector holding lever 67 acts to hold the sector opening lever 66.

The operation of the camera of the aforesaid construction will now be described for both focal plane shutter operation and for lens shutter operation. In the case of the focal plane shutter operation, reference is made to FIG. 5 showing the focal plane shutter in the state as wound up. When the shutter button is depressed, the exposure time control circuit is energized to generate a magnetic attraction at the electromagnet 4 through a mechanism related to exposure preparation. By such magnetic attraction, one end 41b of the second stop lever 41 is attracted to the core of the electromagnet, and at the same time, the starting lever 39 is caused to rotate clockwise. Thus, end 38b of the first stop lever 38 is pushed clockwise against the elastic force of the bias spring 37 to turn the first stop lever 37 clockwise. The pawl 38a of the lever 38 is disengaged from the stepped portion of the first stop plate 32 to allow clockwise rotation of the main shaft 31 by the elastic force of the drive spring 36. Upon rotation of the main shaft 31, the first stop plate 32, the second stop plate 33, the focal plane kick-off cam 34, and the transmission gear 35, all mounted on the main shaft 31, are turned therewith, and the remaining portion of the control mechanism comprising the transmission gears 42, 43, 44 and the mechanical joint 45 on the camera body are also rotated. Due to such rotational of the control mechanism, a projection 34a of the focal plane kick-off cam 34 kicks the front mask stop lever 28 to turn it clockwise against the bias force acting on it. Thus, mechanical stoppage on the front mask stop plate 21 is removed to release and actuate the front mask. After a predetermined angular displacement of the main shaft 31, the notch 33a of the second stop plate 33 is brought into engagement with the arm 41a of the second stop lever 41, and further rotation of the control mechanism is prevented.

Then, the exposure time control circuit is energized when the control mechanism is started or when the front mask system is started, and after a proper time interval has elapsed, the magnetic attraction of the electromagnet 4 is diminished to allow clockwise rotation of the second stop lever 41 due to the elastic force of the spring 40. Thus, the arm 41a of the lever 41 is removed from the notch 33a of the second stop plate 33 to start further rotation of the control mechanism. The aforesaid proper time interval is so selected as to produce such a focal plane shutter slit as to result in a desired exposure time considering the travelling velocity of the mask and the starting positions of both the front and the rear masks. Upon restart of the control mechanism rotation, the projection 34a of the focal plane kick-off cam 34 kicks the rear mask stop lever 30 to allow its clockwise rotation against the elastic bias force. Thus, the stoppage on the rear mask stop plate 26 is removed to release and start the rear mask system. Thereby the exposure is completed.

In this case of focal plane shutter operation, a conventional interchangeable lens assembly having a lens aperture control means only and not shutter sectors is utilizable. However, if a special interchangeable lens assembly according to the present invention as shown in FIG. 7 together with the camera body and in FIGS. 9 and 10 together with the lens shutter mechanism mounted therein, is utilized, the sector opening lever 66 is turned clockwise against the elastic bias force to actuate the interconnecting lever 58 through engagement between the projection 66a and the arm 58c of the cam 58. Thus, the sector ring 59 is rotated to open the sectors 61, and at the same time the sector opening lever 66 is locked in its open position by the notch 67a of the sector holding lever 67. Thus, the sectors are held opened and only the lens aperture control means can be actuated. Therefore, either a conventional lens assembly or the interchangeable lens assembly according to the present invention can be used for focal plane shutter operation.

In the case of lens shutter operation, when the special interchangeable lens assembly is mounted on the camera body, the mechanical joint 47 on the lens assembly cylinder is meshed with the mating mechanical joint 45 on the camera body, which is connected to the control mechanism. Thereby, the operation of the lens shutter is controlled by means of the aforesaid control mechanism. In other words, by a suitable shutter type selecting mechanism (not shown), the exposure time control circuit is partially switched over so as to suit the lens shutter operation, and at the same time, an auxiliary lever (not shown) for stopping the rear mask is actuated so that the rear mask system is held in the state when the stoppage on the rear mask stop plate 21 is removed by the clockwise rotation of the rear mask stopping lever 30 responsive to kick action of the focal plane kick of cam 34.

The operation of the control system in the camera body 13 from the depression of the shutter button to the start of the front mask system is the same as the focal plane shutter operation. In the lens cylinder 11, as the main shaft 31 is rotated responsive to the clockwise rotation of the starting lever 39, the lens shutter kick-off cam 46 is rotated in a counter-clockwise direction through the gearing means of the control mechanism. Referring to FIGS. 9 and 10, when the projection 46a of the cam 46 kicks one end of the set ring starting lever 54 to rotate it counter-clockwise, the stoppage at the stopped portion 51c of the set ring 51 is removed. Thus, the set ring 51 turns in a counter-clockwise direction by the spring 53 to cause kick-off of the bent portion 56a of the cam stopping lever 56 by the pin 57 planted on the set ring 51 to release the sector opening cam 55. Upon release of the sector opening cam 55 by disengagement of the projection 56b and the bent portion 55a, the cam 55 is turned clockwise by the stored energy of the cam spring 57 to strike the arm 58a of the interconnecting lever 58 by the projection 55b of the sector opening cam 55. As the interconnecting lever 58 rotates in a counter-clockwise direction, the arm 58b urges the pin 60 on the sector ring 59 to rotate the sector ring 59 clockwise against the elastic bias force of the spring 70. Accordingly, such rotation of the sector ring 59 turns each sector 61 clockwise around the pin 62 on the lens cylinder 11 by means of the driving pin 63 on the sector ring 59, and hence, the lens shutter starts opening gradually to its full open position. When the sectors 61 are fully opened, the projection 59a of the sector ring engages with a notch 64a of the sector stop lever 64, and hence the return or clockwise rotation of the sector ring 59 due to the elastic force of the spring 70 is effectively stopped.

As in the case of the focal plane shutter operation, the exposure time control circuit is actuated upon starting of the sectors 61, and after a proper time interval has elapsed, the magnetic attraction of the electromagnet 4 is diminished to release the stoppage by the second stop lever 41. Then, the main shaft 31 is rotated again due to the removal or the engagement between the arm 41a and the notch 33a. Accordingly, the lens shutter kick-off cam 46 is also further rotated to strike end 64b of the sector stop lever 64. Thus, the stoppage on the sector ring 59 is removed to allow counter-clockwise rotation of the sector ring 59 to close the sectors 61. Thereby the exposure is completed.

In the case of the lens shutter operation, if a camera is employed having a separate view finder which does not include the photographing lenses in its optical system, the film can be rolled up for the following photographing operation with the rear mask kept stationary by said auxiliary rear mask holding lever or with the focal plane shutter held open. However, if a monocular reflex camera is utilized, the stoppage of the rear mask should be released when the sectors 61 are closed to use the sectors as a light shielding member, and then the sectors should be opened again by a suitable means, such as a sector opening lever 66, to allow the use of the view finder.

Although the present invention has been described with a certain degree of particularity, it is to be understood that the present disclosure has been made only by way of example and the various changes and modification may be resorted to without departure from the spirit and the scope of the invention.

What is claimed is:

1. A camera capable of carrying an interchangeable lens assembly, comprising a camera body, a plurality of interchangeable lens assemblies each being mountable on said camera body one at a time, a shutter means having at least shutter blades and a shutter actuating mechanism, an electric circuit for controlling the shutter speed of said shutter means, each said lens assembly having said shutter blades and only that portion of the electric circuit which actuates said shutter blades, and an electric connector to complete said electric circuit between said lens assembly and said camera body.

2. A camera according to claim 1, wherein said camera body includes an exposure time control circuit having an electromagnet, a shutter control mechanism for operating said shutter means responsive to an exposure time preset on said exposure time control circuit, a focal plane shutter equipped with an operating mechanism therefor, a shutter type selecting mechanism to selectively actuate said exposure time control circuit, said shutter control mechanism, and said focal plane shutter operating mechanism; while each said interchangeable lens assembly includes a lens shutter operating mechanism to be controlled by said shutter control mechanism and a means for holding the lens shutter blades as opened.

References Cited
UNITED STATES PATENTS

| | | | |
|---|---|---|---|
| 2,926,576 | 3/1960 | Gunther | 95—64 XR |
| 3,093,047 | 6/1963 | Neff | 95—59 |
| 3,115,078 | 12/1963 | Freeman | 95—59 |
| 3,394,644 | 7/1968 | Ettischer | 95—64 |

JOHN M. HORAN, Primary Examiner

LEO H. McCORMICK, Jr., Assistant Examiner

U.S. Cl. X.R.

95—44, 64